INVENTOR.
BERNARD W. SZNYCER

INVENTOR.
BERNARD W. SZNYCER
BY Mauro & Lewis,
ATTORNEYS

United States Patent Office 2,973,815
Patented Mar. 7, 1961

2,973,815

PITCH CONTROL MECHANISM FOR HELICOPTER ROTORS

Bernard W. Sznycer, New York, N.Y., assignor to Omega Aircraft Corporation, New York, N.Y., a corporation of New York Filed Nov. 8, 1957, Ser. No. 695,354

1 Claim. (Cl. 170—160.25)

The invention relates to a pitch control mechanism for the rotor blades of helicopters. In a majority of such machines, lift and directional flight are achieved by applying two forms of pitch to the rotating blades, collective pitch and cyclic pitch. Collective pitch is an adjustment of all the blades in the same degree, to provide the desired amount of vertical lift. Cyclic pitch is a feathering of the blades so that each blade passing a selected point in azimuth will experience minimum or maximum pitch setting and the opposed minimum or maximum pitch setting in an azimuth diametrically opposed. Cyclic pitch thus accounts for directional flight of the helicopter.

In conventional systems, a device known as a swashplate is suspended beneath the rotor hub and is connected by control rods to the axially movable blades. The swashplate rotates with the blades and is universally movable about the rotor shaft. Accordingly, axial or tilting action of the swashplate is transmitted to the rotor blades in the form of the adjustments to pitch described above.

The invention has for its objects the provision of means for producing such axial and tilting action in the swashplate, in a manner such that an adjustment of cyclic pitch will not transmit a change in collective pitch, and vice versa, unless such adjustments are deliverately made to the controls at the same time.

Another object of the invention is the provision of a swashplate control device of rugged and simple construction, which is unaffected by vibrations which are prevalent in helicopters. The device is furthermore designed for easy servicing on the machine and can be quickly removed as a unit for repair or replacement.

Other objects and advantages of the invention will be discussed in connection with the drawing, wherein.

Figure 1:
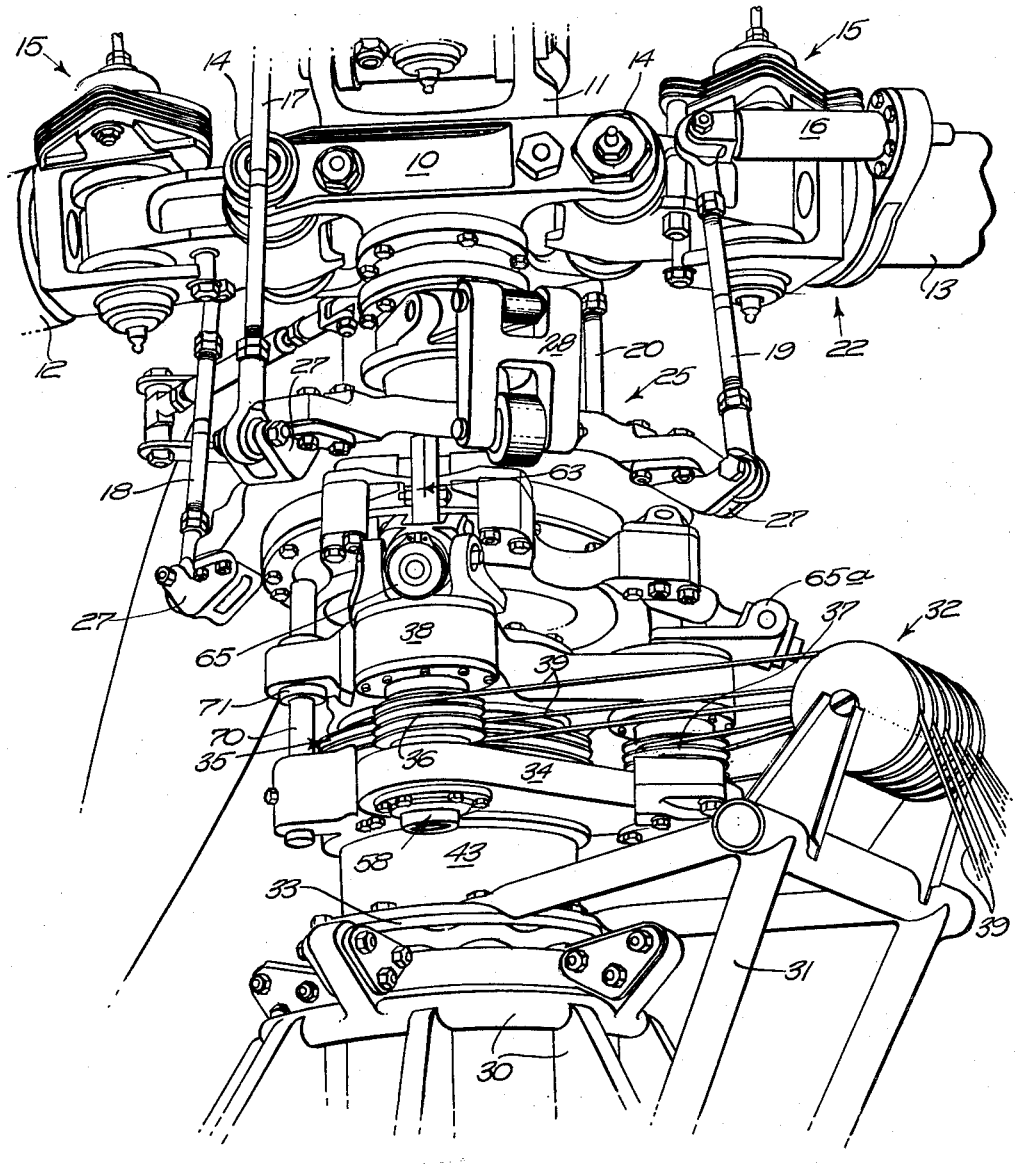
Fig. 1 is a perspective view of the invention as applied to a four blade helicopter rotor.

The invention is illustrated as applied to a four bladed helicopter rotor, the hub 10 of one pair appearing in Fig. 1, the other hub 11 being only partly shown. These hubs are splined to the upper end of the rotor shaft 21 which appears centrally in Fig. 2. Two of the four rotor blades are fragmentarily shown as attached to hub 10 and identified at 12 and 13, it being understood that hub 11 similarly mounts two blades at 90° to blades 12 and 13. Other connections shown between hub 10 and blades 12—13 consist of the flapping hinges 14 and drag hinges 15.

Each blade is mounted for tilting movement on its own axis by means of a bearing located externally of the drag hinges, as indicated at 22. Control horns, such as horn 16 carried by blade 13, connect with four pitch control rods 17—18—19—20. Vertical movement of these rods accordingly regulates the pitch or angle of the rotor blade to which it is connected through the control horns.

The swashplate assembly is generally indicated at 25 and consists of an outer ring-shaped azimuth plate 26 (Fig. 2) having four extending arms 27 at 90° spacing, to which are connected the control rods 17—18—19—20. Plate 26 is supported for rotary movement with the rotor blades and for universal movement with respect to rotor shaft 22, by means of two scissors spaced at 180°, scissors 28 being seen in Fig. 1, scissors 28a being seen at the top of Fig. 2. These scissors connect plate 26 to the base of hub 10 by suitable collars.

In Fig. 1, the remaining parts shown are the upper portion of the pylon of a helicopter fuselage shown at 30. A frame extension 31 carries a series of six pulleys indicated at 32. Mounted on pylon 30 and enclosing the rotor shaft is a pedestal 33 above which is mounted a stationary supporting plate or housing 34. Also seen in Fig. 1 are the central, or collective control, pulley 35 and a pair of smaller, or cyclic control, pulleys 36—37. Above the pulleys is mounted a movable plate or housing 38 whose position relative to plate 34 is controlled by movement of collective pulley 35, as will be further described.

Each of the three pulleys carries a control wire such as those indicated generally at 39, the two ends of which pass over the pulley wheel pairs 32 and lead to the control cabin of the helicopter in a manner not shown, where the control wire of the collective pulley 35 may be connected to a collective pitch control stick and the control wires from the cyclic pulleys 36—37 to a cyclic control stick, in known manner.

The invention will be further described in connection with Figs. 2 and 3. Externally of pedestal 33 is movably mounted a collective acme screw 40 separated therefrom by suitable bushings 41, acme screw 40 meshing with collective acme nut 42, the latter being supported in a bearing housing 43 spaced by suitable bearings 44. Collective pulley 35 is mounted on a peripheral flange formed at the top of acme nut 42.

The upper end of the acme screw 40 is formed with an external flange which is bolted at 45 to the inner rim of the movable plate or housing 38. An adapter ring 46 in turn connects plate 38 and screw 40 to the lower end of the gimbal support 47.

The upper end of gimbal support 47 carries the inner gimbal pins 48—49 spaced 180° from each other, on which is pivoted the gimbal ring 50. Ring 50 in turn is provided with the outer gimbal pins 51—52 spaced 180° from each other and at 90° from inner pins 48—49. Pins 51—52 tiltably support the outer gimbal ring 55.

Ring 55 is connected to azimuth plate 26 through suitable bearings 56 in such manner that movement of the non-rotating gimbal assembly is transmitted to the rotating azimuth plate 26. Said movement, as mentioned above, can take the form of tilting movement or vertical movement.

The cyclic pulley 36 and connected parts, best seen in Fig. 3 and the left side of Fig. 2, will next be described. Pulley 36, having a splined hollow central bore, is housed in bearings 57 carried in stationary plate 34. A hollow splined shaft 58 is caried in the bore of pulley 36. Shaft 58 is given sufficient length to extend downwardly beneath pulley 36 and support 34 to allow for up-and-down movement therein without interruption of the connection of these parts, as will be further described. In an arm of plate 38 directly above, another bearing pair 59 is located which houses cyclic acme nut 60. Nut 60 rests on and is coupled to shaft 58.

Threaded internally of acme nut 60 is the cyclic acme screw 61, the head of which is formed with a yoke 62 carrying the link 63, in turn connected through the arm 64 to the underside of outer gimbal ring 55. Also mounted on plate 38 and connected to yoke 62 is a torque suppressor 65 which consists of a pin 66 linked to yoke 62, pin 66 being slidable in the holder 67, the latter being movable in bearing 68 carried by arm 69. Suppressor 65 accordingly prevents any tendency of acme screw 61 to rotate upon actuation of acme nut 60.

Vertical movement of plate 38 and associated parts must be carried out in the same vertical plane with respect to stationary plate 34. Any tendency of plate 38 to move laterally is prevented by one or more pins such as pin 70, Fig. 1, carried by plate 34 and slidable in bearing 71 formed in plate 38.

Figure 2:
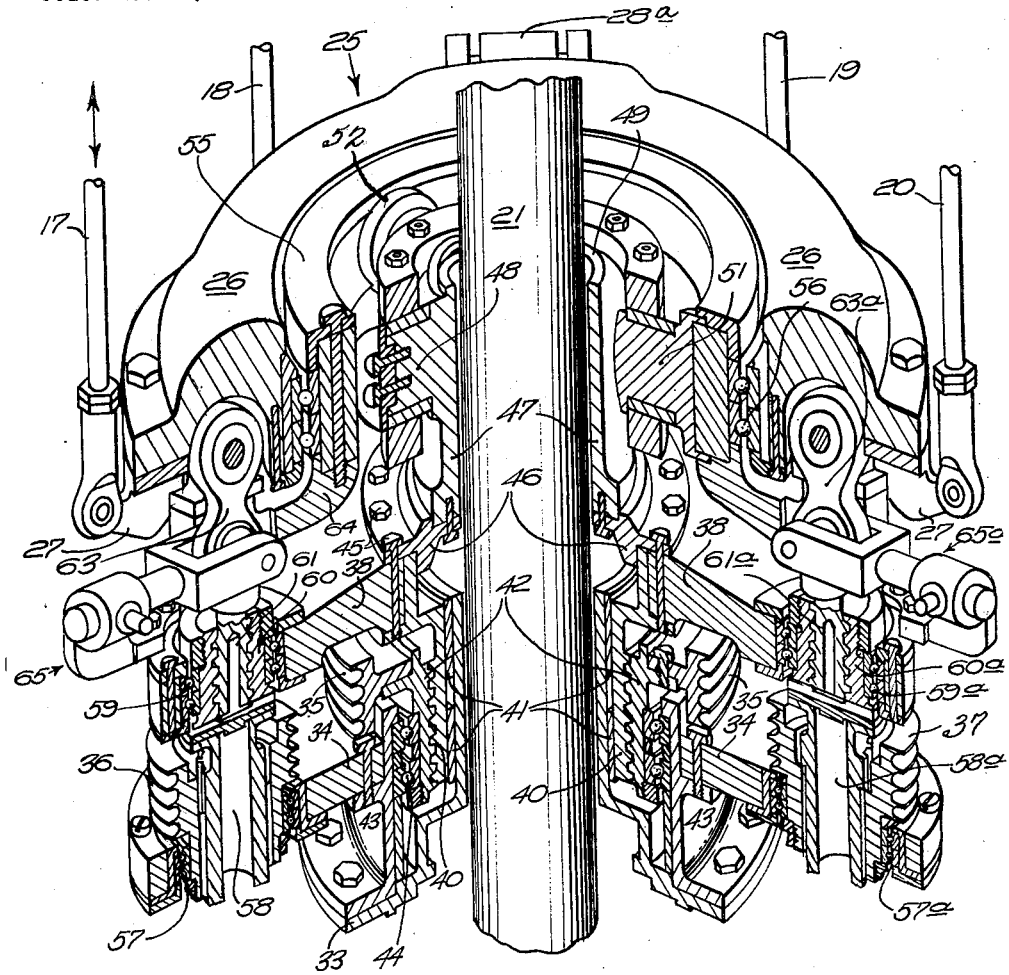
Fig. 2 is an enlarged perspective of the control device in which a 90 degree section has been taken through the three control pulleys and related parts.
Figure 3:
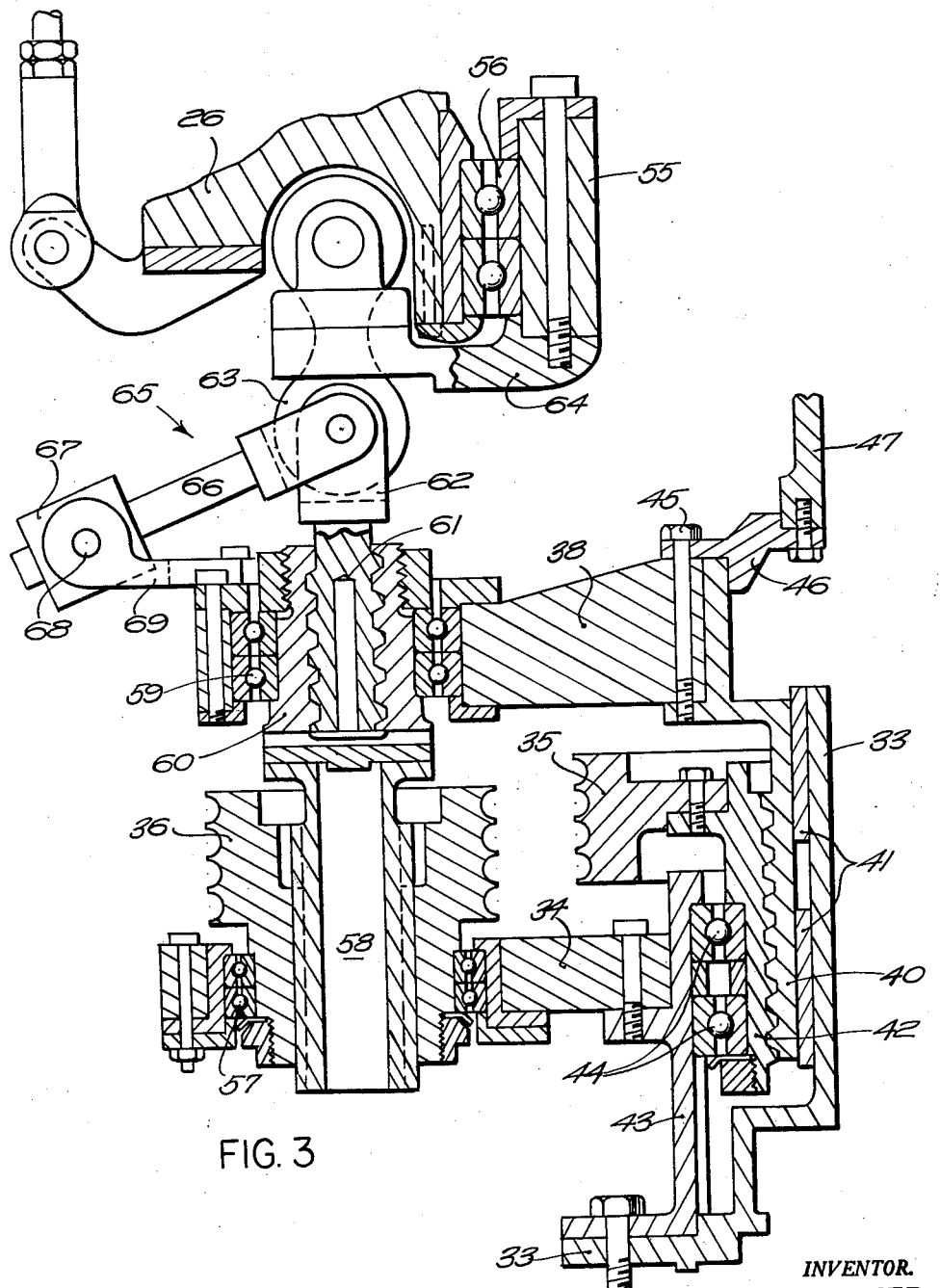
Fig. 3 is an enlarged fragmentary section through half of the central or collective control pulley and through one of the cyclic control pulleys.

The other cyclic control, consisting of pulley 37 and related parts, is constructed the same as described above for pulley 36 and the same numerals with the designator "a" are shown in Fig. 2 to identify corresponding parts. The two cyclic control assemblies are located 90° apart and the entire device is mounted on the pylon 30 in such relationship with respect to the front and rear of the machine that one cyclic control will affect lateral motion and the other, longitudinal motion.

The operation of the control means will next be described. When the cyclic pulley 36 is rotated, the acme nut 60 forces acme screw 61 to move vertically up or down. This motion is transmitted through link 63 to gimbal ring 55 which is accordingly tilted and imparts the same motion to azimuth plate 26. Correspondingly, rotation of cyclic pulley 37 will cause tilting of azimuth plate 26 in the other direction at right angles to the movement caused by pulley 36. If both pulleys are actuated at once, a combination of the two movements is imparted to plate 26.

The actuation of the cyclic controls is thus accomplished without any affect on the adjustment of the collective pitch which is motivated by collective pulley 35. When pulley 35 is actuated, vertical motion is imparted through acme screw 40 and support 47 to the entire gimbal system and the entire azimuth plate 26 is raised or lowered without affecting the tilt thereof. During this manipulation, plate 38 moves vertically to an equal degree, but it will be seen that no movement of the cyclic acme screws 61—61a results therefrom. Splined shafts 58—58a merely slide vertically in the bores of pulleys 36—37 and the connection of these parts is not affected.

These movements of the azimuth plate are in turn transmitted to the rotor blades in the manner already described.

What is claimed is:

Means for selectively and severally imparting collective and cyclic pitch adjustments to a swashplate mechanism forming part of a helicopter, the latter including a helicopter frame, a rotor, means for rotating said rotor, said rotor having plural rotor blades and means for adjusting the pitch thereof, said swashplate mechanism having a rotary, vertically movable and tiltable portion connected to said pitch adjusting means for said rotor blades, said swashplate mechanism also having a non-rotary vertically movable and tiltable portion connected by bearing and gimbal means with said rotary portion, said pitch imparting means including: a first housing member disposed around said rotor which is fixed with respect to said helicopter frame, a second housing member disposed around said rotor between said first housing member and said swashplate mechanism, said second housing member being mounted for movement axially of said rotor but secured by means preventing rotary movement relative to said rotor, said second housing member being fixedly connected to said non-rotary portion of said swashplate mechanism with respect to vertical movements; rotatable, vertically movable screw means connected between said first and second housing members disposed to vary the relative vertical position of said member and consequently the collective pitch of said rotor blades controlled by the swashplate mechanism, other vertically movable screw means carried by said second housing member, said other screw means each including threaded nuts held by said second housing member for rotary movement, vertically movable screws meshing with said threaded nuts and connected to said non-rotary portion of said swashplate mechanism in spaced relation to each other, rotary means carried by said first housing member, rotary extensible connections between said rotary means and said threaded nuts, the said rotary extensible connections consisting of vertically movable rotatable splined shafts attached to said threaded nuts, and making a splined connection with said rotary means carried by said first housing member, said shafts extending through and beyond said rotary means to maintain an extensible driving connection during movement of said second housing member relative to said first housing member; and independent actuating means for each of said screw means.

References Cited in the file of this patent

UNITED STATES PATENTS

| | | |
|---|---|---|
| 2,394,846 | Cox | Feb. 12, 1946 |
| 2,439,089 | Hodson | Apr. 6, 1948 |
| 2,626,766 | McDonald | Jan. 27, 1953 |
| 2,670,804 | Campbell | Mar. 2, 1954 |

FOREIGN PATENTS

| | | |
|---|---|---|
| 572,081 | Great Britain | Sept. 21, 1945 |
| 652,817 | Great Britain | May 2, 1951 |